United States Patent [19]

Hallenbeck

[11] 4,096,372

[45] Jun. 20, 1978

[54] PURGE UNIT

[76] Inventor: Emerson J. Hallenbeck, 2934 Shoreland Ave., Toledo, Ohio 43611

[21] Appl. No.: 744,761

[22] Filed: Nov. 24, 1976

[51] Int. Cl.² .............................................. B23K 9/16
[52] U.S. Cl. ................................. 219/72; 219/60 A; 219/136; 228/57
[58] Field of Search ................ 219/60 A, 61, 74, 75, 219/72, 125 R, 125 PL, 137 R, 136; 228/57, 219

[56] References Cited

U.S. PATENT DOCUMENTS

| | | | |
|---|---|---|---|
| 2,802,092 | 8/1957 | Hauck | 219/61 |
| 2,805,316 | 9/1957 | Chapman | 219/72 |
| 3,754,115 | 8/1973 | Roberts et al. | 219/74 X |
| 3,994,429 | 11/1976 | Hallenbeck et al. | 219/74 X |

*Primary Examiner*—Arthur T. Grimley
*Assistant Examiner*—N. D. Herkamp
*Attorney, Agent, or Firm*—Allen D. Gutchess, Jr.

[57] ABSTRACT

A purge unit is provided for establishing an enclosed zone around a weld area to receive an inert gas. The purge unit is particularly useful when a branch pipe is to be affixed to a main pipe or a header. The purge unit is inserted into an opening in the header through the branch pipe or connection and is then expanded to establish the enclosed zone around the inside of the weld area. An inert gas is then supplied to the unit into the zone to cover or blanket the inside of the weld area. After the weld is complete, the purge unit is collapsed and withdrawn through the opening and through the branch connection so as not to leave any material within the main pipe which could cause contamination.

12 Claims, 3 Drawing Figures

PURGE UNIT

This invention relates to a purge unit for establishing an enclosed zone around a weld area to receive and contain an inert gas during welding.

It is essential when welding stainless steel and most other alloy metals that the weld area be out of contact with air or any form of oxygen during the welding. Otherwise, the metal in the weld area oxidizes and produces micro-cracks, resulting in a totally unsatisfactory weld. In many instances, it is common for a branch connection or pipe to be connected to an existing main pipe or header at a later time after the header is otherwise completed. Heretofore, for welding the branch connection to the header, the entire header had to be purged, which required a considerable volume of inert gas and also a considerable amount of time to assure that the purge gas had removed all impurities within the header.

In accordance with the invention, an expandable, cone-shaped purge unit is provided which establishes an enclosed zone inside the header around the weld area. Inert gas is supplied to the enclosed zone with only a small fraction of the inert gas otherwise required being employed and with the time to assure complete purging also being substantially reduced.

Prior to welding the branch connection, an opening is first made in the header at the position where the branch connection is to be positioned with the size of the opening usually being about the size of the internal passage in the branch connection. The connection is then aligned with the opening and the new purge unit inserted through the connection and the opening into the header. The purge unit includes an expandable, cone-shaped member connected to an elongate member. When the cone-shaped member is moved into the header, it is expanded and is then withdrawn slightly to place the peripheral edge in contact with the inner surface of the header around the opening. The expansion of the cone-shaped member is accomplished by an inflatable resilient member or balloon which urges outwardly the cone-shaped member when the balloon is inflated. The elongate member is then suitably sealed with respect to the branch connection and inert gas is supplied through the elongate member into the enclosed zone formed by the expanded cone and the wall of the header. After the weld is complete, the cone-shaped member is collapsed by deflating the balloon and is then withdrawn through the opening and the branch connection so as not to leave any material in the header which could cause contamination.

It is, therefore, a principal object of the invention to provide a purge unit which enables a weld area to be purged more rapidly and with considerably less inert gas.

Another object of the invention is to provide a purge unit having an inflatable balloon within a cone-shaped member for expanding the cone-shaped member after it is inserted into a header or the like to which a branch connection or the like is to be welded.

Many other objects and advantages of the invention will be apparent from the following detailed description of a preferred embodiment thereof, reference being made to the accompanying drawings, in which.

Figure 1:
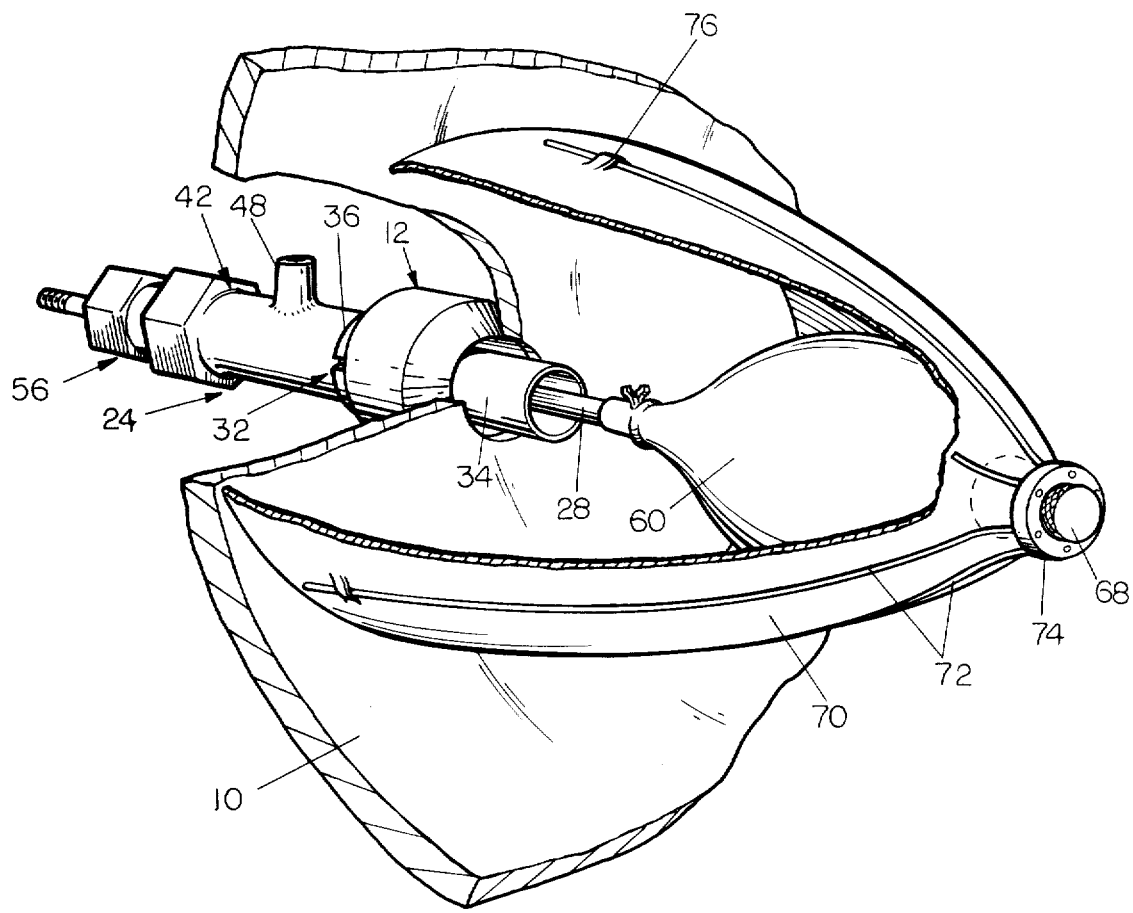
FIG. 1 is a somewhat schematic view in perspective of a purge unit embodying the invention in place within a header or the like, with parts of the unit broken away and with parts in section.

Referring to the drawings, a main pipe or header 10 has a branch line or connection 12 which is in an approximate position to be affixed thereto. The connection, as shown, is specifically in the form of a female coupling to receive a branch pipe after the connection is welded to the header. The connection has an inner passage 14, the diameter of which is substantially equal to the diameter of an opening 16 made in the wall of the header 10. The connection also has a larger outer diameter 18 into which the branch pipe will subsequently be inserted and affixed. The connection 12 further has a beveled end 20 designed to be welded to the header wall in a manner known in the art. The header itself can be of a widely varying range of sizes with a diameter from ½ inch up and with the branch connection similarly having a wide variety of shapes and sizes from ½ inch up.

In order to weld the connection 12 to the header 10, the inner surface of the header has to be purged when stainless steel and other alloy metals are employed. Heretofore, it was necessary for the entire header 10 to be purged throughout its entire length. This resulted in a considerable amount of inert gas and considerable time being required for purging to assure that all contaminants throughout the header were removed by the purge gas.

To overcome this, an enclosed zone is established within the header 10 which has a volume only a small fraction of that of the entire header, which results in only a small fraction of the gas otherwise required being employed, thereby producing considerable savings in the cost of gas and in the time required for purging prior to welding. The enclosed zone is established by means of a purge unit indicated at 22 which basically includes an elongate member 24 carrying an expandable, cone-shaped member 26.

For the basic operation of the purge unit 22, the elongate member 24 and the cone-shaped member 26, when collapsed, are inserted through the connection 12, the passage 14, and the opening 16 into the header 10. The cone-shaped member 26 is then expanded and withdrawn slightly until its outer edge contacts the inner surface of the header to form an enclosed zone 27 around the weld area adjacent the opening 16. Purge gas is then supplied through the elongate member 24 into the zone 27. After the connection 12 is welded to the wall of the header 10, in the usual manner, the cone-shaped member 26 is collapsed around the elongate member 24 and withdrawn through the now-welded connection.

The elongate member 24 of the purge unit 22 consists of several components. It includes an inner, central supply pipe or tube 28 having an outer threaded end 30 to which a suitable supply line from a source of gas under pressure is connected. This line can have a check valve therein to prevent escape of gas under pressure back through the pipe. The pipe 28 also extends through a fitting 32 which has an end nipple 34 projecting into the header through the passage 14 and also has an outer, flared, end 36 which is received in the larger, outer recess 18 of the connection 12. The flared end 36 is segmented and has internal threads 38 to receive a threaded end 40 of a sleeve 42. When the sleeve 42 is turned into the end 36, it tends to expand the end 36 of the fitting 32 to provide a mechanical engagement with the connection 12. The sleeve 42 can then be held by the welder to hold the connection 12 in place while it is being initially tack welded to the header 10. The sleeve 42 can be connected by the fitting 32 to the connection 12 prior to the insertion of the member 26 into the header 10. The pipe 28 can then be independently manipulated to seat the one-shaped member 26.

The sleeve 42 also has a central passage 44 extending longitudinally therethrough, through which the pipe 28 extends. A transverse supply passage 46 communicates with an intermediate portion of the passage 44 with the sleeve having a nipple 48 with internal threads 50 to which a supply line from a suitable source of purge or inert gas can be connected. This gas can then flow around the pipe 28 and through the passage 44 and the fitting 32 into the enclosed zone 27.

The outer end of the sleeve 42 has an internal thread 52 which receives a threaded end 54 of a collet 56, the end 54 also being split or segmented so as to be urged inwardly when screwed into the threaded end 52 of the sleeve 42. This action then clamps the collet 56 against the pipe 28 to hold the two stationary relative to one another after the member 26 has been expanded and properly positioned in the header 10 and prior to supplying the purge gas to the zone 27. An O-ring 58 forms a seal between the outer end of the sleeve 42 and the collet 56.

Figure 2:
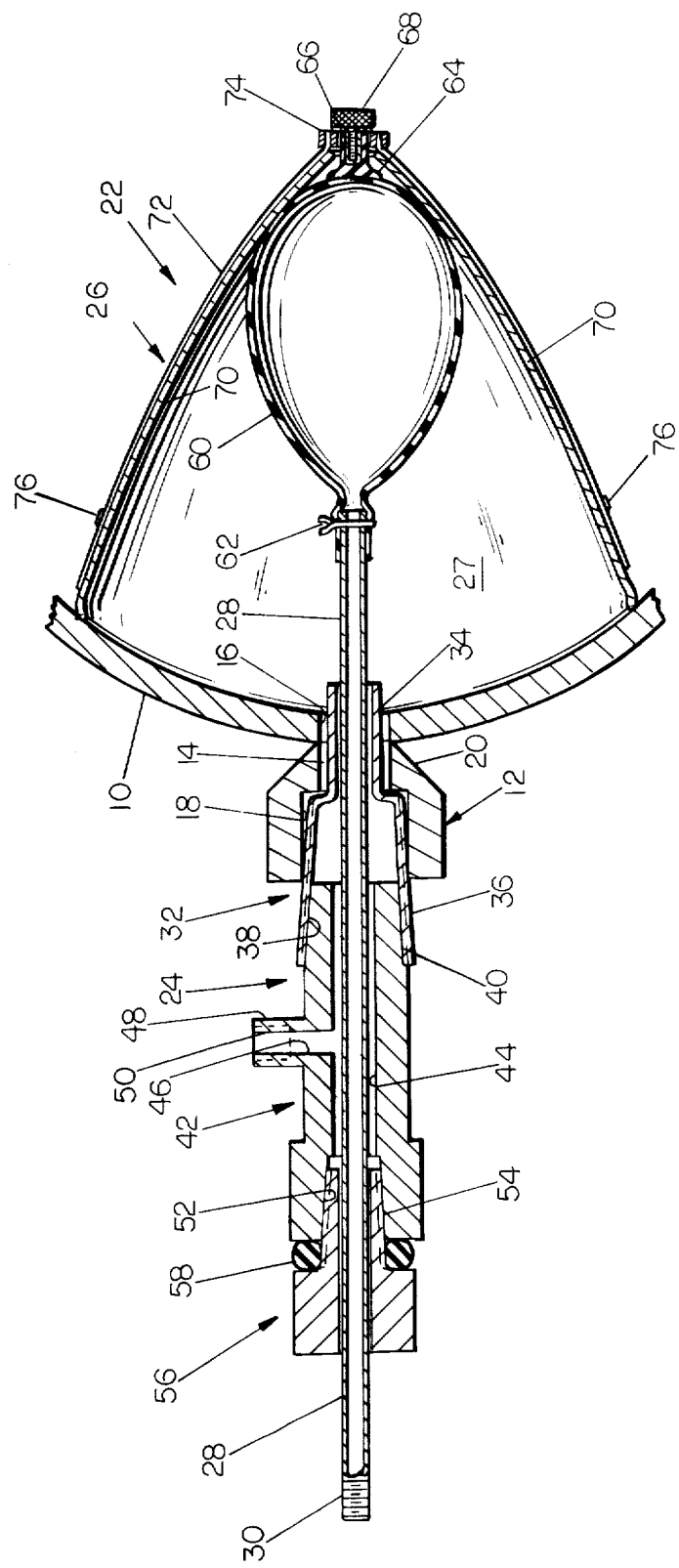
FIG. 2 is a view in longitudinal cross section taken through the purge unit, the header, and a branch connection shown in FIG. 1.

In accordance with the invention, an expandable member or balloon 60 is affixed to the inner end of the pipe 28 by a wire 62 or other suitable band or connection. The balloon 60 preferably is of a heavy rubber and, when expanded, causes the cone-shaped member 26 to expand outwardly to the position of FIGS. 1 and 2. The balloon also preferably has longitudinally extending folds to provide a degree of longitudinal stiffness, with spring wires and a cone wall, to be discussed subsequently, lying in the folds when the balloon is collapsed.

Figure 3:
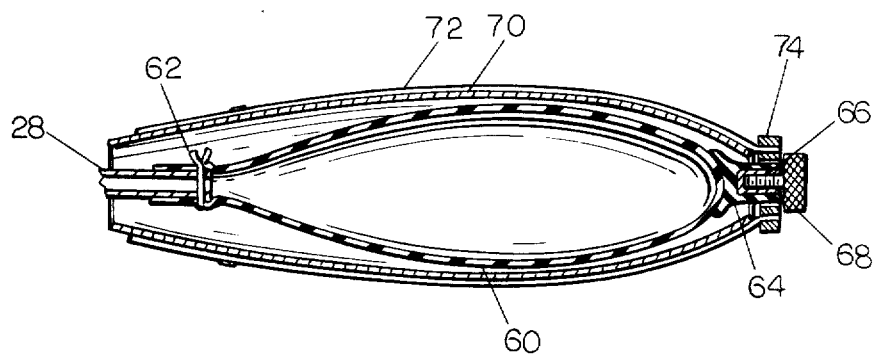
FIG. 3 is a view in longitudinal cross section taken through a cone-shaped member and a balloon of the purge unit of FIGS. 1 and 2, when in a collapsed condition.

A mounting member 64 is affixed to the end of the balloon 60 opposite the pipe 28, as by vulcanizing. The mounting member 64 has a threaded metal insert 66 molded therein to receive a knurled screw 68. This enables the cone-shaped member 26 to be mounted on the member 64 and on the balloon 60. The cone-shaped member 26 includes a wall 70 of a suitable woven material or fabric which is capable of withstanding higher temperatures, in the order of 300° F, to which the wall 70 can be subjected during welding. The member 26 also includes a plurality of resilient spring wires 72 which are affixed to a mounting ring 74 and which extend, when in an unstressed position, along the balloon 60 and the pipe 28, as shown in FIG. 3. To connect the wires 72 to the ring 74, the ring can have a plurality of holes drilled therein with the ends of the wires then silver soldered therein. The ring 74 and an intermediate portion of the wall 70 are clamped between the head of the screw 68 and the mounting member 64 so as to be held by the balloon 60 at the end opposite the pipe 28.

The outer ends of the spring wires 72 are affixed to the wall 70 by suitable loops 76 so as to move the wall 70 outwardly as the spring wires are urged outwardly when the balloon 60 is inflated. The ends of the spring wires 72 preferably stop short of the periphery of the wall 70 to assure that the cone-shaped wall will contact the inner surface of the header. With large diameter headers, the periphery of the wall 70, if circular, will substantially fully engage the inner surface of the header wall. However, with smaller diameter headers, it may be desirable to specially shape the peripheral edge of the cone-shaped member to conform more fully to the inner surface of the header wall. For this purpose, the edge of the cone-shaped member actually can be elliptical with portions extending horizontally outwardly from the opening 16 to accommodate the contour of the header more fully. Of course, it is not essential that a completely gas-tight engagement or contact be achieved between the member 26 and the header wall since slight leakage will not affect the weld although slightly more gas might be used.

The operation of the new purge unit 22 will be apparent from the prior discussion but will be reviewed briefly. The cone-shaped wall 70 and the mounting ring 74 are assembled on the mounting member 64 with the balloon 60 being connected on the pipe 28. The sleeve 42 is then affixed to the connection 12 by inserting the fitting in the connection and then turning the end 40 of the sleeve 42 into the threaded end 36 of the fitting. This assembly is then inserted through the connection 12 and the opening 16 into the header, with the fitting 32 assembled with the connection 12. With the collet 56 loosely assembled with the sleeve 42, the fluid under pressure can be supplied through the pipe 28 to the balloon 60 to expand the cone-shaped member 26. The pipe 28 can then be withdrawn slightly to cause the peripheral edge of the wall 70 to engage the inner surface of the header 10. The collet 56 is then tightened to hold the components of the overall elongate member 24 in place. The purge gas line is connected to the nipple 48 of the sleeve 42 to supply the purge gas to the enclosed zone formed by the cone-shaped member 26 and the end 20 of the connection 12 can be tack welded to the header while the welder holds the sleeve 42.

When the weld is complete, the supply line for the pressurized gas for the balloon can be disconnected to enable the pressure to be released and enable the spring wires 72 to move back toward the collapsed position of FIG. 3, collapsing the wall 70 therewith. When the sleeve 42 is partially unscrewed from the fitting 32, the entire assembly can then be withdrawn through the opening 16 and the passage 14 of the now-welded connection 12. There is nothing then left in the header to cause possible subsequent contamination and the amount of purge gas employed is a minimum.

If desired, purge gas can also be employed to inflate the balloon 60. This has the advantage that should the balloon 60 break, there will be no oxygen to weaken the weld being made between the connection 12 and the header. Otherwise, any gas under a few pounds pressure will be sufficient to expand the cone-shaped member 26 by means of the balloon 60.

Various modifications of the above-described preferred embodiment of the invention will be apparent to those skilled in the art, and it is to be understood that such modifications can be made without departing from the scope of the invention, if they are within the spirit and the tenor of the accompanying claims.

I claim:

1. A purge unit for establishing an enclosed zone around a weld area, said unit comprising an elongate member, a flexible, expandable member having an edge portion adapted to engage the surface of a workpiece around the weld area to establish the enclosed zone, and means connected to said elongate member and said expandable member and forming an expandable chamber within said expandable member to urge said expandable member outwardly to form the enclosed zone with said expandable chamber-forming means being within said enclosed zone and shaped from the weld area.

2. A purge unit according to claim 1 wherein said expandable chamber means is a balloon.

3. A purge unit according to claim 2 characterized by said elongate member having passage means to supply gas under pressure to said balloon.

4. A purge unit according to claim 3 characterized by said elongate member having further passage means to supply purge gas to the enclosed zone when said expandable member is expanded.

5. A purge unit according to claim 1 characterized by said elongate member forming a central passage to supply gas under pressure to said expandable chamber means and forming an annular passage around said central passage to supply purge gas to the enclosed zone when said expandable member is expanded.

6. A purge unit for establishing an enclosed zone around an opening in a main pipe to which a connection is to be welded, said unit comprising an elongate member, means forming an expandable chamber connected to an end of said elongate member, expandable wall means having an intermediate portion attached to a portion of said expandable chamber means spaced from said elongate member, said wall means having portions adapted to engage the inner surface of said main pipe around the opening when expanded by said expandable chamber means and said expandable chamber means being spaced from the inner surface of said pipe when said inner surface is engaged by said portions of said wall means.

7. A purge unit according to claim 6 wherein said expandable chamber means is a balloon.

8. A purge unit according to claim 7 characterized by said elongate member having passage means for supplying gas under pressure to said balloon.

9. A purge unit according to claim 8 characterized by said elongate member having further passage means to supply purge gas to the enclosed zone of said wall means.

10. A purge unit according to claim 7 characterized by collapsible means for collapsing said wall means when said balloon is deflated.

11. A purge unit according to claim 6 characterized by said elongate member having means enabling said elongate member to be affixed to said connection.

12. A purge unit according to claim 6 characterized by said elongate member including a sleeve, passage means extending through said sleeve to supply gas to said expandable chamber means, and said elongate member further including means for affixing said passage means to said sleeve in various longitudinal positions.

* * * * *

UNITED STATES PATENT OFFICE
CERTIFICATE OF CORRECTION

PATENT NO. : 4,096,372

DATED : June 20, 1978

INVENTOR(S) : Emerson J. Hallenbeck

It is certified that error appears in the above–identified patent and that said Letters Patent are hereby corrected as shown below:

Claim 1, last line, "shaped" should be --spaced--.

Signed and Sealed this

Sixth Day of January 1981

[SEAL]

Attest:

SIDNEY A. DIAMOND

Attesting Officer

Commissioner of Patents and Trademarks